United States Patent [19]
Smith

[11] Patent Number: 4,638,622
[45] Date of Patent: Jan. 27, 1987

[54] SAFETY ROLLER ASSEMBLY FOR BRACKET MOUNTING TO THE TOP OR REAR FACE OF ROTARY LAWN MOWER DECK

[76] Inventor: David C. Smith, Rte. 3, Box 630, Proctorville, Ohio 45669

[21] Appl. No.: 810,129

[22] Filed: Dec. 18, 1985

[51] Int. Cl.$^4$ ............................................. A01D 53/08
[52] U.S. Cl. ................................ 56/17.4; 56/DIG. 24
[58] Field of Search ................... 56/17.4, 320.1, 320.2, 56/DIG. 24

[56] References Cited

U.S. PATENT DOCUMENTS

| | | | |
|---|---|---|---|
| 3,106,812 | 10/1963 | McDonagh | 56/320.1 |
| 3,226,920 | 1/1966 | Gilbertson | 56/17.4 |
| 3,378,995 | 4/1968 | Welsh | 56/320.1 |
| 3,402,535 | 9/1968 | Nelson | 56/320.1 |
| 3,461,653 | 8/1969 | Miller et al. | 56/17.4 |
| 3,537,720 | 11/1970 | Irgens | 56/320.2 |
| 3,555,793 | 1/1971 | Chapman | 56/17.4 |
| 3,727,386 | 4/1973 | Jespersen et al. | 56/17.4 |
| 3,799,579 | 3/1974 | Dahl | 56/17.4 |
| 4,322,938 | 4/1982 | Efflandt | 56/17.4 |

*Primary Examiner*—Robert P. Swiatek
*Assistant Examiner*—John G. Weiss
*Attorney, Agent, or Firm*—Sughrue, Mion, Zinn, Macpeak and Seas

[57] ABSTRACT

A pair of U-shaped sheet metal brackets are fixably mountable to the rear vertical wall of a power lawn mower deck to opposite sides of the deck or to the top wall of the deck with the open ends facing end other. Bent wire rod angle arms have their free ends of arm first branches pivotably mounted to the base of the U-shaped sheet metal brackets for pivoting internally of the bracket legs limited to contact with the legs of the brackets and their other branch has ends fixed to an axle rotatably supporting a roller for rotation horizontally about its axis and between the angle arm branches at the rear of the rotary power mower. Pivoting of the angle arms limits vertical travel of the roller to several inches to prevent the operator's foot from being projected relatively beneath the mower deck and into the path of the rotating blade of the power mower. Changing the angle of inclination between the branches of the wire rod angle arms permits alternate mounting of the U-shaped brackets to the rear wall or top wall of the mower deck.

3 Claims, 2 Drawing Figures

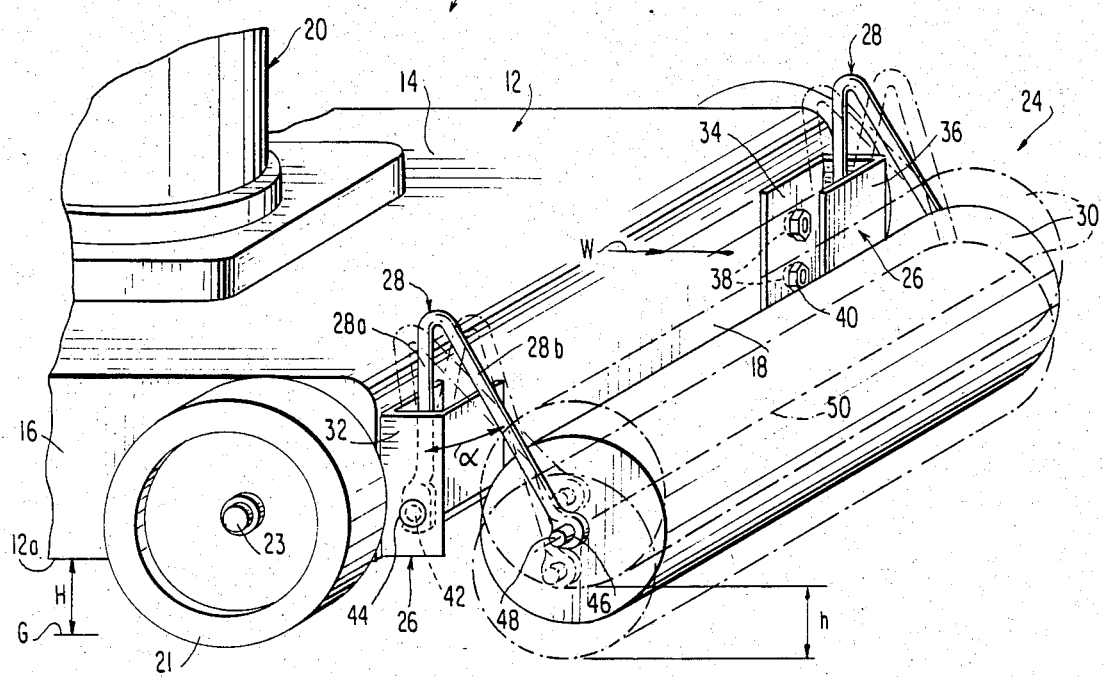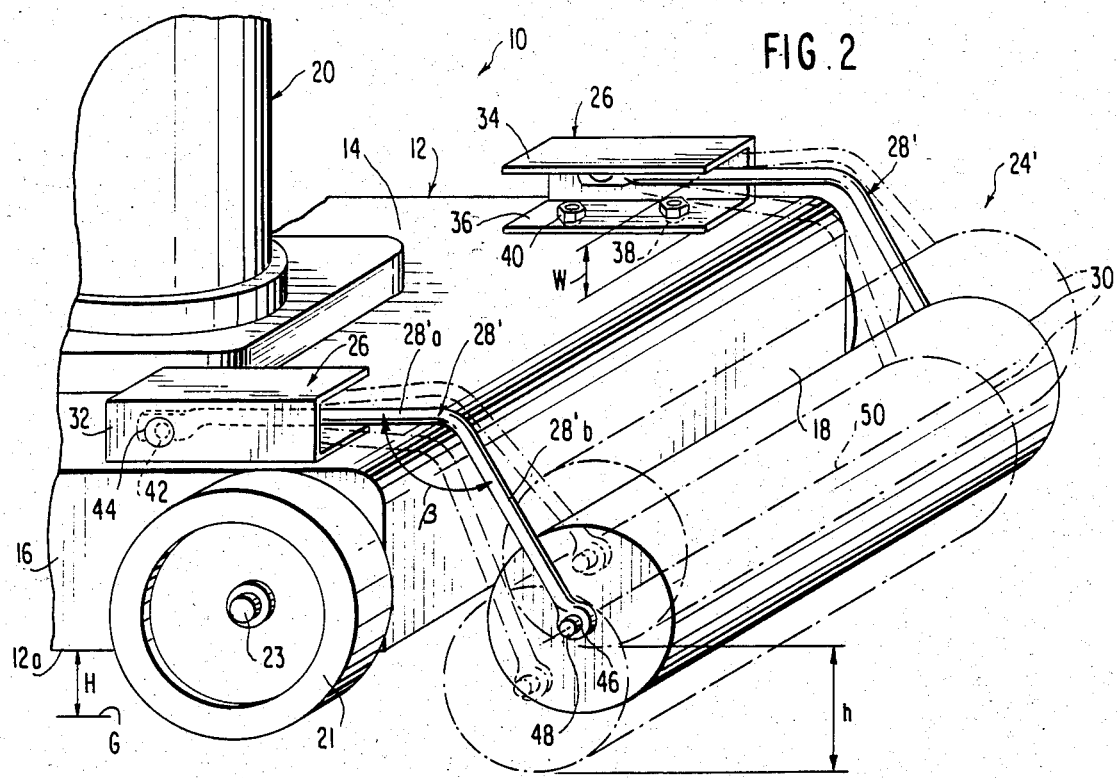

SAFETY ROLLER ASSEMBLY FOR BRACKET MOUNTING TO THE TOP OR REAR FACE OF ROTARY LAWN MOWER DECK

FIELD OF THE INVENTION

This invention relates to safety shields for powered rotary lawn mowers and more particularly to a safety roller assembly of simplified construction and utilizing brackets, for mounting to either the top face or rear face of a rotary lawn mower deck with the brackets limiting the permissible rise and fall of the safety roller.

BACKGROUND OF THE INVENTION

Safety studies have shown that upwards of a 100,000 persons per year have been injured in accidents involving push type rotary power lawn mowers. While the utilization of a high speed rotating cutting blade positioned parallel to the ground and housed within a hollow mower deck or housing supported by front and rear wheels is a highly effective in cutting of grass, such mowers are extremely dangerous to operate, particularly since the mowers are often operated by children. The mower deck or housing is spaced somewhat above ground level by means of wheels which are in turn vertically adjustable so as to control the cutting height of the grass. Depending upon the height above the ground of the lower edge of the mower deck or housing, such mowers constitute a danger to the operator whether that be a child or an adult. Mowers follow the contour of the lawn, many lawns have portions which are on grade, and it is possible for the lawn mower to slip backwards, on a hill, while the blade is under powered operation. Under such circumstances it is possible for the operator to have the rotating blade cut into the operators foot due to an inadvertent backward movement of the mower. Additionally, as is often the case, objects such as toys or rocks, which are hidden in the grass, are in turn hit by the rotating blade and become projectiles which can fly in any given direction as a result of impact, often towards the operator.

Attempts have been made to provide safety shields for such lawn mowers. Shields have taken the form of inclined pivotable plates which are pivotably mounted to the rear vertical wall of the mower deck or housing or, alternatively, a roller may be pivotably mounted at its ends for rotation about its axis and in turn coupled to the mower deck. In such cases, the plate or roller is permitted to follow the contour of the lawn as well as to adjust for the height adjustment of the cut grass determined by variably adjusting the coupling between the rear wheels and the mower deck or housing.

U.S. Patents representative of the prior art safety shields in safety devices, are as follows:

U.S. Pat. No. 3,040,503
U.S. Pat. No. 3,106,812
U.S. Pat. No. 3,402,535
U.S. Pat. No. 3,461,653
U.S. Pat. No. 3,537,720
U.S. Pat. No. 3,555,793
U.S. Pat. No. 3,570,225
U.S. Pat. No. 4,216,643

It may be appreciated that some of the prior art devices are simple, others complicated. Some permit latching of the safety shield in a raised or out of ground contact position when the mower is out of use. Some provide for height adjustment to vary the height of the roller relative to the deck or housing or, alternatively, to limit the movement of the safety device whether it be a plate or roller relative to the mower deck or housing.

It is an object of this invention to provide a safety roller assembly for bracket mounting to a rotary lawn mower deck which is of relatively few parts, which is simple, light and inexpensive and which may be mounted to either of the mower deck top or the vertical mower deck rear wall and in which vertical travel of the roller is limited and carefully controlled by the mechanism for mounting the roller to the mower deck.

Other objects and a fuller understanding of the invention may be had by referring to the following description and claims.

SUMMARY OF THE INVENTION

The present invention is directed to a safety roller assembly for bracket mounting to the top or rear vertical face of a rotary lawn power mower deck. The safety roller assembly has application to a rotary lawn power mower of the type having a hollow mower deck comprised of at least a top wall, spaced, lateral side walls and a vertical rear wall. A horizontal blade is rotatably mounted in the hollow mower deck and a plurality of vertically adjustable wheels are mounted to the side walls of the mower deck for adjustably elevating the mower deck off the ground and for controlling the cutting height of the grass. The safety roller assembly comprises a pair of U-shaped mounting brackets in the form of base and integral right angle legs extending generally parallel to each other; a pair of bent wire rod angle arms, said angle arms having integral branches angled relative to each other; and means for pivoting the free end of one of said angle arm branches to the base of the U-shaped bracket. A roller having a length generally equal to the length of the mower deck rear wall extends thereacross and axle means mount said roller for rotation about its axis. The axle means is mounted to the free ends of said other branches of said angle arms. Means are provided for fixably mounting one of said bracket legs to one of said top wall and rear wall of said mower deck such that the one branch of the angle arms pivoted to the base of the U-shaped brackets pivot to an extent limited by the bracket legs to control the vertical travel of said safety device roller which extends across the rear of the mower deck. Each angle arm is bent such that with the brackets mounted to the rear vertical face of the mower deck, the angle between branches is an acute angle and wherein the branch of the angle arm mounted to the base of the U-shaped bracket and projecting outwardly of the bracket between the spaced parallel legs, is generally vertical. Where the bracket is mounted to the top wall of the mower deck the branch of the angle arm pivoted to the base of the U-shaped bracket extends generally horizontally and the angle between the branches of each angle arm is obtuse.

BRIEF DESCRIPTION OF THE DRAWINGS

FIG. 1 is a perspective view of a portion of a rotary power mower to which the safety roller assembly of the present invention is mounted and forming a preferred embodiment thereof.

FIG. 2 is a perspective view of a portion of a rotary power mower and an alternate embodiment of the safety roller assembly of the present invention.

DESCRIPTION OF THE PREFERRED EMBODIMENTS

In the two figures which show alternate embodiments of the present invention, like elements are given like numerical designations. Referring to FIG. 1, a rear portion of a rotary power mower indicated generally at 10 is shown, with the handle thereof purposely deleted so as to clearly show the safety roller assembly 24 forming one embodiment of the present invention. The rotary power mower 10 comprises a hollow mower deck indicated generally at 12, which is of rectangular plan configuration, and is partially formed of a horizontal top wall 14, a pair of opposite side walls 16 only, one of which is shown, and a vertical end rear wall 18. The mower deck defines a hollow housing, within which is mounted a horizontal cutting blade (not shown) which rotates about a vertical axis via powered by drive means indicated generally at 20. Typically, such power drive means 20 may take the form of an internal combustion engine or an electric drive motor to which the rotating cutting blade is shaft mounted.

Typically, the mower deck is supported by four wheels, one of which is shown at 21 and which rotates about axle 23. Typically, the cutting height of the grass is adjusted by raising or lowering the wheels, such as wheel 21, so as to vary the distance H between the lower edge 12a of the mower deck and the ground G, upon which the mower rests. Due to the gap H between the lower edge of the mower deck and the ground, it is possible for the operator's foot to move underneath the mower deck 12 and into the path of the rotating cutting blade. It is also, as mentioned previously, possible for the mower to tend to move backwards on an incline so that the rear wall 18 of the mower deck rides over the operator's foot.

The present invention is therefore directed to an improved, lightweight and simplified but highly effective safety roller assembly. The safety roller assembly, indicated generally at 24, is comprised of three different basic components. These are a pair of oppositely directed U-shaped brackets indicated generally at 26, a pair of bent wire rod angle arms indicated at generally at 28, and a elongated cylindrical roller indicated generally at 30. The roller is preferably of a length nearly equal to the lateral width of the mower deck 12. Roller 30 may be formed of metal, plastic or wood.

Each bracket 26 is formed of sheet metal, is of U-shaped configuration, and is defined by a base 32 and integral right angle, laterally facing parallel side walls or legs 34, 36. In the embodiment of FIG. 1, the brackets 26 are mounted to the vertical rear wall 18 of mower deck 12, to opposite ends thereof and U-shaped brackets 26 open towards each other. In this embodiment, legs or side walls 34 bear a pair of aligned, spaced mounting holes 38, through which project mounting screws or the bolts 40 such that the U-shaped brackets 26 are rigidly affixed to the vertical rear wall 18 of the mower deck 12. Nuts (not shown) are threaded to bolts 40. The base 32 of each bracket 26 is provided with a single hole 42 within which is fixedly mounted pivot pin 44; the pin projecting inwardly of the base between the pair of side walls 34, 36 of the bracket. In the simplified construction of the safety roller assembly 24, each bent wire rod angle arm 28 is formed by integral, branches 28a, 28b, which branches are at an acute angle a to each other, in the embodiment of FIG. 1 of approximately 30°. The free end of branch 28a is radially enlarged and has a bore of a size to rotatably receive pivot pin 44. The head of the pivot pin 44 may be peened over so as to lock leg 28a on the pivot pin and permit the angle arm 28 to rotate about a horizontal axis defined by pivot pin 44. Similarly, the free end of branch 28b of each angle arm is radially enlarged and bears a circular hole or bore 46 within which is received one end of axle 48, the axle passing through an axial bore within roller 30 to rotatably mount the roller between angle arms 28, at opposite ends thereof.

As an important aspect of the present invention, purposely the width of bracket base 32 is such that the distance between side walls or legs 34, 36 of each bracket 26 is on the order of a width W which in turn determines and limits the vertical travel h of the roller itself as it is displaced between the two extreme positions shown in dotted line. The pair of side walls act as stops to limit oscillation of the angle arms 28 upon which mount the roller 30 for rotation about roller axis 50 as the upper edges of the two side walls 34, 36 are contacted by the angle arm branches 28a.

As a result, it may be appreciated that the roller 30 which may be of steel, wood or plastic is suspended by the pivotably mounted angle arms 28, behind the rotary mower 10, under conditions in which the roller 30 contacts the ground G but is permitted to move up and down to follow the contour of the ground. That movement is limited to a maximum of 2 inch vertical travel h and while this movement is permitted, it will not allow the toes of the operator to get close to the blade of the mower 10. Unlike the drag plates, roller 30 has little drag forward or backward. The roller 30 cannot fold under the mower 10 as do the plates or metal shields due to the drag. Further, the roller 30 not only prevents the operator's foot from going under the mower deck 12 from the rear, but protects the operator from flying objects as projectiles due to contact with the rotating blade. To change the vertical travel h of the roller 30, the position of the pivot pins 44 within base 32 of the U-shaped brackets may be shifted along the base towards or away from the end of the bracket from which the angle arm projects. A shorter distance between the pivot pin 44 and that end of the bracket results in a larger arcuate swing of branch 28a of the angle arm and thus an increase in the vertical travel h of the roller 30.

In the embodiment of FIG. 1, the safety roller assembly 24 has roller 30 and angle arms 28 shown in full lines in intermediate position and in dotted lines at the extreme raised and lowered positions, effected by rocking of angle arms 28 about their pivot axis as defined by pin 44 to permit the vertical travel h 2 inches as illustrated.

Turning to FIG. 2, the embodiment of FIG. 2 shows the same basic components, and like elements to that of FIG. 1 bear like numerical designations. However, prime designations are utilized where the elements are modified from that of FIG. 1. In that respect, the mower 10 is identical to that of the first embodiment; the portion shown depicting the rear half of the mower deck 12. Deck 12 is comprised of a flat, horizontal top wall 14, laterally spaced vertical side walls 16 and terminates in a vertical rear wall 18; the walls 14, 16, 18 being integral with each other. Power drive means 20 drives the cutting blade (not shown) which rotates about a vertical axis and in a horizontal plane within the interior of the mower deck 12. The wheels 21 permit a vertical height adjustment of the cutting blade through mower deck or housing 16 by vertically shifting the position of the pivot axis 23 of each wheel 21. Thus, the gap or height H between the lower edge 12a of the mower deck 12 and the ground G may be readily varied. In this embodiment, the safety roller assembly 24' utilizes similar components, to that of the assembly 24 of FIG. 1. In fact, roller 30 is identical. The U-shaped brackets 26 are identical although their placement on the mower deck is changed. Further, in view of this change, the angle arms 28' while comprised of integral angular branches or sections 28a' or 28b' are at an obtuse angle β of about 120° to each other. In this case, the base 32 is oriented vertically, further, leg 36 bears a pair of mounting bracket holes as at 38 through which project screws or bolts 40. Thus, the side wall or leg 36 of each bracket 26 is bolted or screwed to the top wall 14 of mower deck 12. The brackets 26 open towards each other and are mounted adjacent to the vertical side walls 16, to opposite sides of the mower deck 12. Leg 28a' is pivotably mounted by way of a fixed pivot pin 44, within pivot pin mounting hole 42 of the base 32 of each bracket 26. Further, the free end of branch 28b' of each angle arm 28' is radially enlarged, having a hole 46 passing therethrough, which hole receives one end of axle 48. Axle 48 extends through an axial bore within roller 30 and mounts the roller 30 for roller rotation about a horizontal axis. In a similar manner to the first embodiment, the pair of bracket side walls 34, 36, act as stops to limit the pivoting of the angle arms 28' and thus the vertical travel h of the roller 30 as indicated by the dotted line positions above and below the full line position in which leg 28' is generally horizontal. Further the extend of vertical travel h can be changed by shifting the position of pivot pin 42 longitudinally within a base 32 of each brackets 26. Again, the gap W between the legs 34, 36 of the brackets 26 determines the extent of pivoting of the angle arms to ensure that the gap H between the lower edge 12a of the mower deck and the ground G is suitably covered by the roller so as to shield the operator from objects struck radially outwardly of deck 16 and projected by the mower blade during mower operation as well as to prevent the operator's foot from inadvertently moving beneath the mower deck 16 and in the path of the rotating blade.

The brackets 26 may be formed of sheet metal, the angle arms 28 of wire rod stock and the roller 30 of a metal, plastic or wood as desired. Further, in the embodiments of FIGS. 1 and 2, the angle arms have their branches angulated at approximately 30° and 120° respectively. The wire rod angle arms may be bent to angles other than that as α and β as shown to facilitate the assembly mounting, from kit form, by the simple expedient of rebending the angle arm branches to different angles with respect to each other depending upon the mower deck for the particular rotary power mower receiving the attachment, to facilitate that mounting and to limit the vertical travel of the roller to something in the neighborhood of 2 inches.

The invention has been particularly shown and described with reference to a preferred embodiment thereof, and it will be understood by those skilled in the art that various changes in form and details may be made therein without departing from the spirit and scope of the invention.

What is claimed is:

1. A safety roller assembly for mounting to a rotary lawn mower, said rotary lawn power mower being of a type having a hollow mower deck comprising at least a top wall, spaced lateral sidewalls and a vertical rear wall, a horizontal blade rotatably mounted within the hollow mower deck and a plurality of vertically adjustable wheels mounted to the side walls of said lower deck for adjustably elevating the mower deck off the ground and for controlling the cutting height of the mower, said safety roller assembly comprising; a pair of U-shaped mounting brackets, said mounting brackets including a base and integral, right angle legs extending generally parallel to each other from opposite sides of said base, a pair of angle arms, said angle arms having integral branches angled relative to each other, means for pivoting the free end of one branch of said angle arms to the base of respective U-shaped bracket, a roller of a length generally equal to the length of the mower deck rear wall and extendable thereacross, axle means carried axially by said roller for mounting said roller for rotation about its axis, means for fixing said axle, at respective ends, to the free ends of the other branches of said angle arms, means for fixedly mounting one of said bracket legs of both brackets to one of said top wall and rear wall of said mower deck such that the one branch of the angle arms appended to the base of the U-shaped brackets respectively pivots to an extent limited by the bracket legs, thereby controlling the vertical travel of the safety device roller, and wherein the length of said branches of said angle arms and the angle therebetween and the position of the brackets on the mower deck are such that the periphery of the roller is maintained in contact with the ground during movement of the roller to follow the contour of the ground with the roller rising and falling to the extend limited by the distance between the legs of said U-shaped brackets.

2. The assembly as claimed in claim 1 wherein said angle arms have the branches bent at an angle therebetween permitting the brackets to be mounted to the rear vertical face of the mower deck with the angle between the branches constituting an acute angle with the branch of the angle arm pivotally mounted to the base of the U-shaped bracket in each case, being maintained in a generally vertical upright position.

3. The assembly as claimed in claim 1 wherein the angle arms are bent such that the branches thereof form obtuse angles therebetween to permit the brackets to be mounted to the horizontal top wall of the mower deck under conditions in which the branch of the angle arm pivoted to the base of the U-shaped bracket in each instance extends generally horizontal and parallel to the top wall of the mower deck.

* * * * *